United States Patent [19]

Akashi

[11] Patent Number: 4,845,521

[45] Date of Patent: Jul. 4, 1989

[54] CAMERA WITH AUTOMATIC FOCUSING APPARATUS

[75] Inventor: Akira Akashi, Yokohama, Japan

[73] Assignee: Canon Kabushiki Kaisha, Tokyo, Japan

[21] Appl. No.: 140,219

[22] Filed: Dec. 31, 1987

[30] Foreign Application Priority Data

Jan. 12, 1987 [JP] Japan .................................. 62-4598
Jan. 12, 1987 [JP] Japan .................................. 62-4599
Jan. 12, 1987 [JP] Japan .................................. 62-4600

[51] Int. Cl.$^4$ ............................................... G03B 3/00
[52] U.S. Cl. ............................... 354/400; 354/195.12
[58] Field of Search ............... 354/400, 401, 402, 403, 354/404, 405, 195.1, 195.12, 195.13

[56] References Cited

U.S. PATENT DOCUMENTS

| | | | |
|---|---|---|---|
| 4,153,903 | 5/1979 | Pizzuti et al. | 354/195.13 |
| 4,156,563 | 5/1979 | Kato et al. | 354/405 |
| 4,225,219 | 9/1980 | Shimizu | 354/195.12 |
| 4,314,748 | 2/1982 | Kawabata et al. | |
| 4,416,523 | 11/1983 | Kawabata | |
| 4,459,006 | 7/1984 | Sakai et al. | |
| 4,572,643 | 2/1986 | Akashi | |
| 4,617,459 | 10/1986 | Akashi et al. | |

*Primary Examiner*—Russell E. Adams
*Attorney, Agent, or Firm*—Fitzpatrick, Cella, Harper & Scinto

[57] ABSTRACT

An auto-focus apparatus in a camera having an auto-focusing mode and a manual focusing mode. A circuit determines when the auto-focusing mode cannot be carried out and automatically enables the manual focusing mode. When auto-focusing can again be accomplished, the focusing mode is automatically switched back to auto-focus. Circuitry is provided for prohibiting the switch back to auto-focus mode if it is detected that a manual focus operation has begun. Preferably, an indication control circuit is also provided to cancel an auto-focus indication when the manual focus operation has been detected.

12 Claims, 7 Drawing Sheets

CAMERA WITH AUTOMATIC FOCUSING APPARATUS

BACKGROUND OF THE INVENTION

1. Field of the Invention

The present invention relates to a camera with an automatic focusing (AF) apparatus for automatically performing focus adjustment of an optical system and, more particularly, to an improvement in a focus detecting disable state in the automatic focusing apparatus.

2. Related Background Art

When a focus detecting disable state is caused in a conventional automatic focusing apparatus for automatically performing focus adjustment of an optical system, a user changes an object of interest into an object which allows focus detection or changes an AF adjust mode to a manual focus mode. In the manual focus mode, the user manually adjusts focus control.

If the focus detecting disable state is caused in the AF apparatus, it is inconvenient to change the object to be photographed and the user may miss a good shutter chance. If the AF adjust mode is changed to the manual focus mode in the focus detecting disable state, it requires an additional operation such as an operation of the auto/manual selection switch or the like, thus degrading operability and disabling quick photographing operations.

In order to solve the above problems, the present applicant proposed a camera in U.S. Ser. No. 887,375. This camera can automatically change the AF mode into the manual focus mode when the focus detecting disable state is caused. According to a method described in U.S. Ser. No. 887,375, although focus adjustment can be manually performed in the focus detecting disable state, the user cannot select the AF mode or the manual focus mode.

SUMMARY OF THE INVENTION

One aspect of the application is to provide a camera which allows an arbitrary selection of an AF mode or a manual focus mode, and automatically changes the AF mode into the manual focus mode to allow manual focusing when a focus detecting disable state is caused during focus adjustment.

Another aspect of the application is to provide a camera which inhibits an AF operation to allow focusing in the manual focus mode when a focus detecting disable state is caused during focus adjustment in the AF mode, changes the mode to the AF mode when a focus detecting enable state is restored without manual focusing of the lens after the mode is changed from the AF mode into the manual focus mode, and inhibits a mode change into the AF mode even upon restoration of a focus detecting enable state when the lens is driven in the manual focus mode and preventing driving of the lens in the AF mode, thereby improving operability of the camera.

Still another aspect of the application is to provide a camera which indicates the focus detecting disable state with an indicating means when this state is caused during lens driving in the AF mode and cancels the indication at the indicating means when the lens is manually driven while the indicating means is being operated, thereby preventing a focus detecting disable indication during manual lens driving.

The above and other aspects, features, and advantages of the present invention will be apparent from the following detailed description of a preferred embodiment in conjunction with the accompanying drawings.

BRIEF DESCRIPTION OF THE DRAWINGS

FIGS. 2A to 2E are flow charts for explaining operations in the camera shown in FIG. 1, in which FIG. 2A shows a main routine, and FIGS. 2B to 2E are subroutines branched from the main routine.

DESCRIPTION OF THE PREFERRED EMBODIMENT

A preferred embodiment of the present invention will be described with reference to the accompanying drawings.

Figure 1:
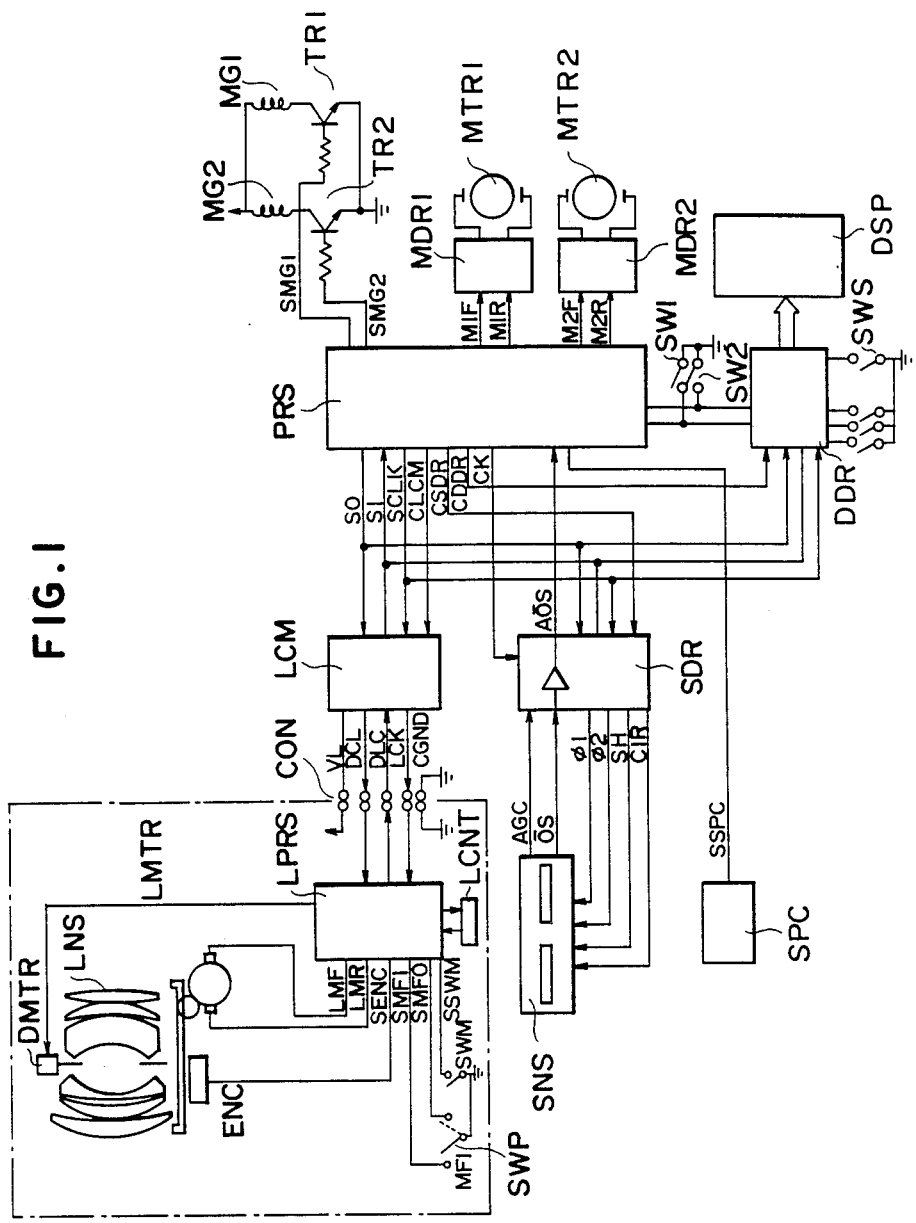
FIG. 1 is a block diagram of a camera according to an embodiment of the present invention.

FIG. 1 is a block diagram showing an arrangement of a camera according to the present invention. A controller comprises a known one-chip microcomputer PRS for performing sequential control operations of the camera. The microcomputer PRS includes functions of an arithmetic and logic unit, a ROM, a RAM and an A/D converter. The microcomputer PRS communicates with peripheral circuits and a photographing lens by using communication signals SO, SI, and SCLK and controls the sequence of operations such as automatic exposure (AE), automatic focusing (AF), film winding, film rewinding, and the like in accordance with programs stored in the ROM. Of the above communication signals, the signal SO serves as a data signal output from the microcomputer PRS, the signal SI serves as a data signal input to the microcomputer PRS, and the signal SCLK serves as a sync signal for the data signals SO and SI.

A lens communication buffer LCM applies a lens power source voltage VL to the lens during the operation of the camera. When a signal CLCM from the microcomputer PRS is set at high level (to be referred to as an "H" level hereinafter; the low potential level is referred to as an "L" level hereinafter), the buffer LCM serves as a communication buffer between the camera and the lens. When the microcomputer PRS sets the signal CLCM at "H" level and sends out predetermined data as the signal SO in synchronism with the signal SCLK, the lens communication buffer circuit LCM outputs buffer signals LCK and DCL respectively corresponding to the signals SCLK and SO to the lens (indicated by the alternate long and short dashed line in FIG. 1) through a camera/lens contact block CON serving as a signal transmitting means. At the same time, the lens communication buffer circuit LCM outputs the signal DLC as the signal SI from the lens to the microcomputer PRS. The microcomputer PRS receives the data signal as the signal SI in synchronism with the signal SCLK.

A driver SDR drives a line sensor unit SNS for focus detecting operation. The driver SDR is selected when a signal CSDR from the microcomputer PRS is set at "H" level and is controlled by the microcomputer PRS using the signals SO, SI, and SCLK. The line sensor unit SNS comprises CCD line sensors. The driver SDR supplies to the line sensor unit SNS drive clocks $\phi 1$ and $\phi 2$ derived from the clock CK from the microcomputer PRS, a signal SH for transferring the charge from a photoelectric transducer section to an analog shift register section, and a charge clear signal CLR for clearing the charge stored in the photoelectric transducer section. An output signal OS from the line sensor unit SNS is a time-serial image signal synchronized with the clocks $\phi 1$ and $\phi 2$. The signal OS is amplified by an amplifier in the driver SDR and the amplified signal serves as a signal AOS. The signal AOS is output to the microcomputer PRS. The microcomputer PRS receives the signal AOS at its analog input terminal and A/D converts the input signal in synchronism with the clock CK by utilizing an internal A/D conversion function. The digital signals converted as described above are sequentially stored at predetermined addresses of the RAM. An output signal AGC from the line sensor unit SNS is an output from a storage control sensor in the line sensor unit SNS and is used to transmit the charging state of the photoelectric transducer section. In response to this, the driver SDR transfers the charge of the photoelectric transducer section to the analog shift register section by the signal SH while the photoelectric transducer section is kept at a predetermined charging level.

An output SSPC from a photometric sensor SPC is input to the analog input terminal of the microcomputer PRS. The signal SSPC is converted into a digital signal, and the digital signal is used for automatic exposure (AE) control.

A switch sense and display driver DDR is selected when a signal CDDR is set at "H" level under the control of the microcomputer PRS. The driver DDR is controlled in accordance with the signals SO, SI, and SCLK. The driver DPS controls driving of a display DPS on the basis of the data sent from the microcomputer PRS and sends ON/OFF states of various operation switches SWS including release switches SW1 and SW2.

Drivers MDR1 and MDR2 serve to drive a film feed motor MTR1 and a shutter spring winding motor MTR2, respectively. The motor MTR1 is driven in the forward or reverse direction in response to a signal M1F or M1R, and the motor MTR2 is driven in the forward or reverse direction in response to a signal M2F or M2R. Shutter front and rear curtain drive magnets MG1 and MG2 are energized by amplifying transistors TR1 and TR2 in response to signals SMG1 and SMG2, respectively. Shutter control is performed under the control of the microcomputer PRS. It should be noted that the switch sense and display driver DDR, the motor drivers MDR1 and MDR2, and shutter control are known to those skilled in the art, and a detailed description thereof will be omitted.

A lens processor LPRS analyzes an instruction from the microcomputer PRS in accordance with the signal DCL from the lens communication buffer LCM and performs focus adjustment and aperture control. The lens processor LPRS outputs a signal DCL and sends various parameters (e.g., a full-aperture f-number, a focal length, and a coefficient of the defocus amount vs. driving amount) to the microcomputer PRS. The lens processor LPRS discriminates the state of an auto/manual selection switch SWM for switching the mode between the AF mode and the manual focus mode. The auto/manual selection switch SWM is arranged in the lens. In the AF mode, the focus adjustment motor LMTR is driven in response to the signals LMF and LMR in accordance with the driving direction and the driving amount both of which are used for AF adjustment and represented by the signal SO from the microcomputer PRS in the camera body, i.e., the signal DCL from the buffer LCM. A photographing optical system LNS of an integral driving type single element lens is moved to the in-focus position. A signal SENC representing the displacement of the photographing optical system LNS is input from the encoder ENC to a counter in the lens processor LPRS. When driving of the photographing optical system LNS to the in-focus position is completed, the signals LMF and LMR are set at "L" level, thereby braking the motor LMTR. When the auto/manual selection switch SWM is set in the manual focus mode, the lens processor LPRS does not cause the driver to drive the motor LMTR by the AF adjustment signal from the microcomputer PRS. In this case, the user manually moves the photographing optical system LNS, or the system LNS is moved by power focusing. Power focusing is performed by connecting a power focus switch SWP on the lens to a terminal MFI or MFO. A signal SMFI or SMFO is input to the lens processor LPRS. When the auto/manual selection switch is set in the manual focus mode, the lens processor LPRS drives the focus adjustment motor LMTR in a direction represented by the signal SMFI or SMFO.

The lens processor LPRS drives a known stepping motor DMTR for driving a diaphragm in accordance with an aperture value difference as the signal SO from the microcomputer PRS, i.e., the signal DCL from the buffer LCM. It should be noted that an encoder for monitoring the stepping motor need not be used because the stepping motor is subjected to open control.

Figure 2A:
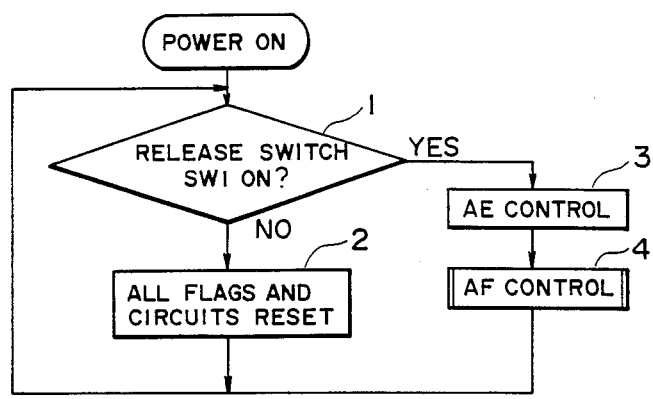

The operations of the camera with an AF apparatus having the arrangement shown in FIG. 1 will be described with reference to flow charts in FIGS. 2A to 2E. The camera shown in FIG. 1 is operated in accordance with programs stored in the ROM in the microcomputer PRS, i.e., with the flow charts in FIGS. 2A to 2E. FIG. 2A shows a main routine and FIGS. 2B to 2E show subroutines branched from the main routine.

Referring to FIG. 1, when a power switch (not shown) is turned on, the circuit components in the camera are set in the standby state, i.e., an operative state. The flow advances to step 1 and the microcomputer PRS detects the state of the release switch SW1. The flow advances to step 2 until the release switch SW1 is turned on, i.e., until the release operation is performed. The microcomputer PRS resets all internal flags and circuits, and the internal flags are thus reset to "0". The flow returns to step 1, and the above operations are repeated.

When the release operation with the first stroke is performed and the release switch SW1 is turned on, the flow advances from step 1 to step 3 as the AE control step. In AE control in step 3, the microcomputer PRS fetches the output SSPC from the photometric sensor SPC and calculates an exposure value. The flow then advances to AF control in step 4.

If the release operation with the second stroke is performed in step 3, i.e., if the release switches SW1 and SW2 are simultaneously turned on, the signal SO from the microcomputer PRS serves as the signal DCL and this drive instruction is sent to the lens processor LPRS through the lens communication buffer LCM. The lens processor LPRS receives the drive instruction to drive the diaphragm drive motor DMTR, thereby controlling the diaphragm. The microcomputer PRS drives the shutter front and rear drive magnets in accordance with the signals SMG1 and SMG2, thereby controlling the shutter to perform exposure operation. After exposure operation is completed, the microcomputer PRS causes the drivers MDR1 and MDR2 to drive the film feed motor MTR1 and the shutter spring winding motor MTR2 so as to feed one frame of the film and perform shutter charging. The above AE control operations are known to those skilled in the art and are not essentially associated with the present invention, so that a detailed description thereof will be omitted.

Figure 2B:
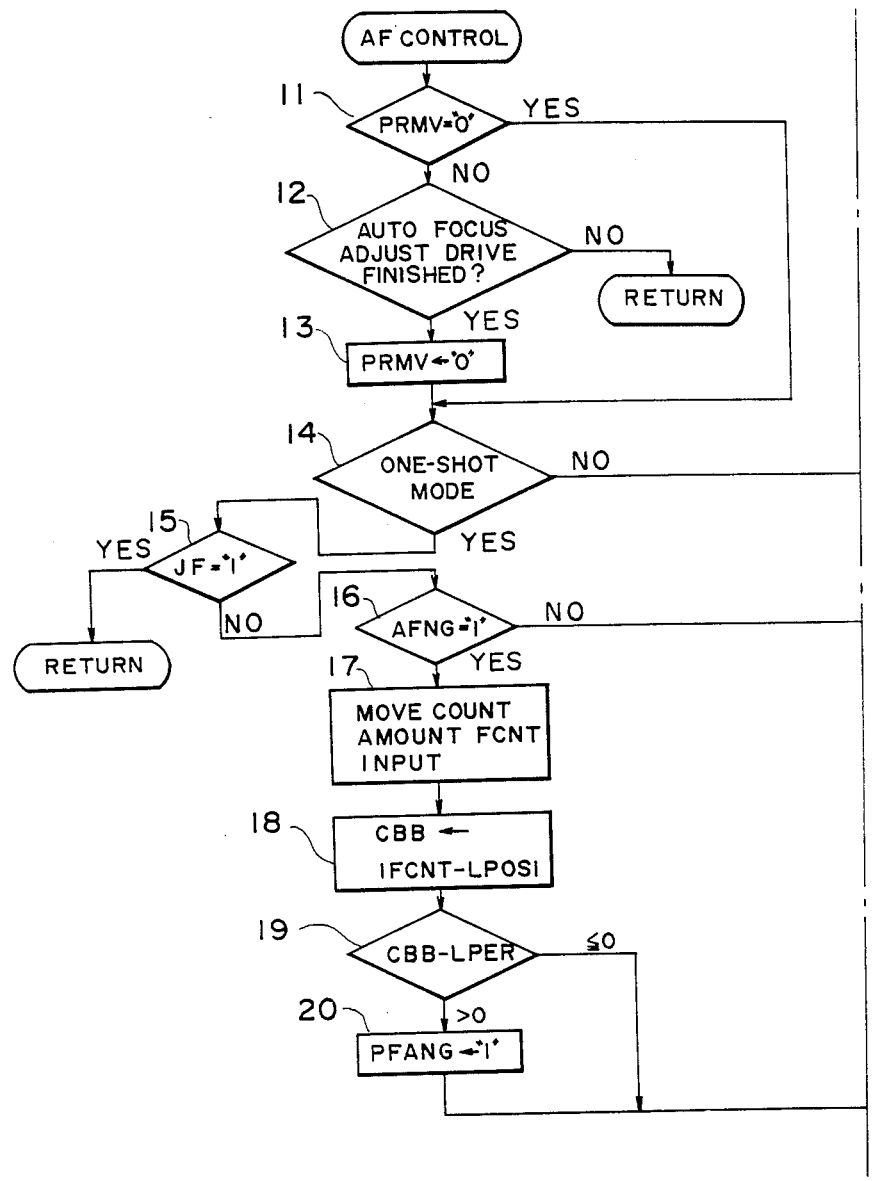
Figure 2B:
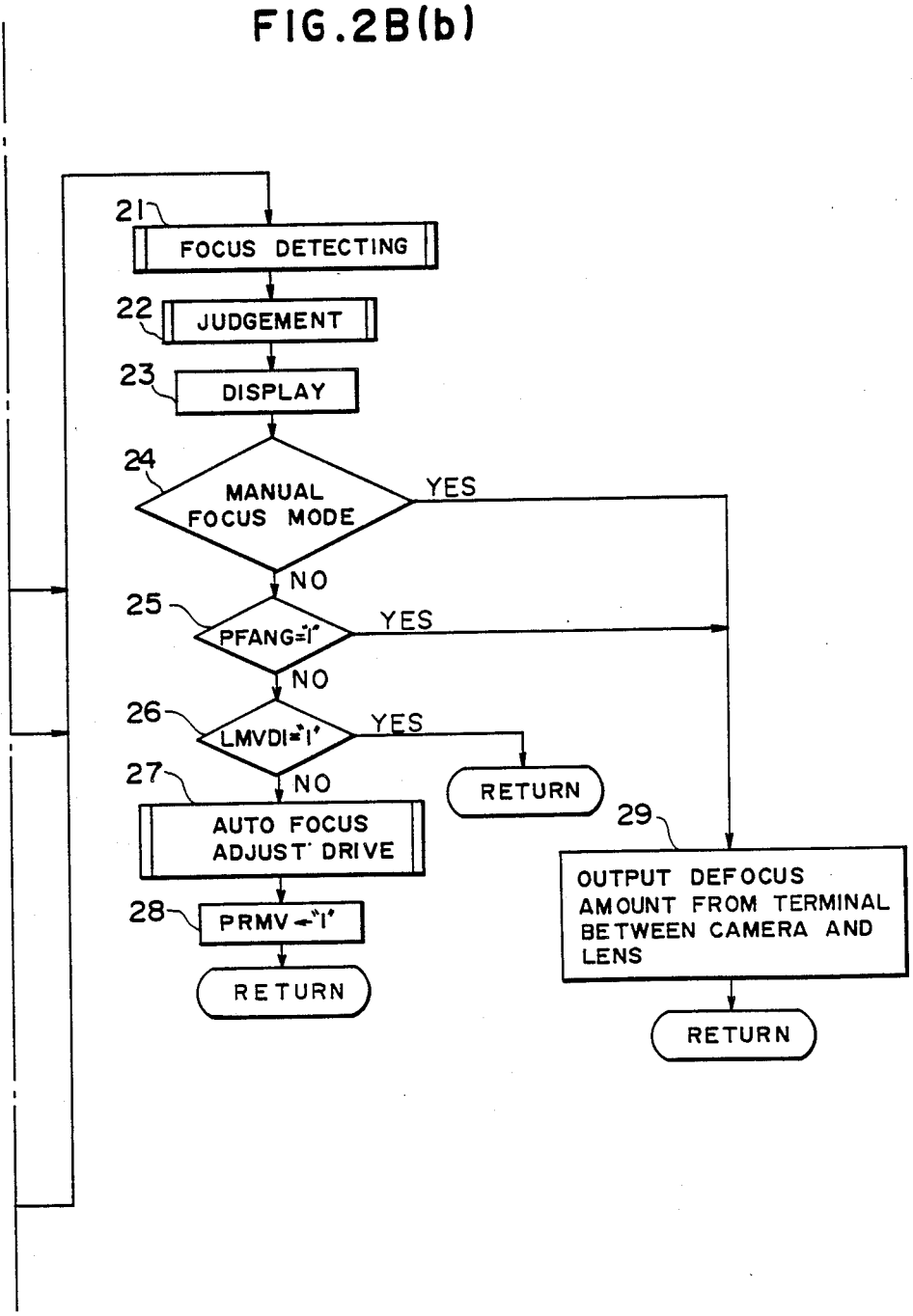

The flow advances from AF control in step 4 to a subroutine in FIG. 2B. In the subroutine in FIG. 2B, the microcomputer PBS determines by the state of a flag PRMV in step 11 whether focus adjustment driving of the photographing optical system LNS on the basis of a defocus amount (to be described later) is performed by the focus adjustment motor LMTR. In this step, since the first loop operation upon operation of the release switch SW1 is performed, the flag PRMV is set at logic "0" and the flow advances to step 14.

By detecting the states of the auto/manual selection switch SWM and the one-shot/servo selection switch included in the switches SWS, the microcomputer PRS determines in step 14 whether the one-shot mode is set. In the one-shot mode, the photographing optical system LNS is subjected to AF adjustment on the basis of the defocus amount (to be described later). When an in-focus state is obtained, no focus adjustment is performed even if the object is moved and becomes out of focus, and initial focus state is maintained. The determination in step 14 is actually performed as follows. The signal SO from the microcomputer PRS is supplied to the lens processor LPRS as the signal DCL through the buffer CLM to instruct generation of an output representing the state of the auto/manual selection switch SWM. In response to this instruction, the lens processor LPRS detects the state of the auto/manual selection switch SWM and generates the signal DCL representing the state of the auto/manual selection switch SWM. This signal DCL is input to the microcomputer PRS as the signal SI through the buffer LCM.

The microcomputer PRS sends the signal SO to the switch sense and display driver DDR to instruct generation of an output representing the state of the one-shot/servo selection switch. In response to this instruction, the switch sense and display driver DDR sends the signal SI representing the state of the one-shot/servo selection switch to the microcomputer PRS.

If the auto/manual selection switch SWM is set in the AF mode and the one-shot/servo selection switch SWS is set in the one-shot mode, the microcomputer PRS determines that the one-shot focus mode is set. If the auto/manual selection switch SWM is set in the AF mode and the one-shot/servo selection switch SWS is set in servo mode, the microcomputer PRS determines that the servo mode is set. In this case, the photographing optical system LNS is subjected to AF adjustment on the basis of the defocus amount. When the object is moved in the in-focus state, the photographing optical system LNS is moved accordingly. If the auto/manual selection switch SWM is set in the manual focus mode, the photographing optical switch SWS is manually or power focused without performing the AF operation regardless of the state of the one-shot/servo selection switch SWS.

If NO in step 14, the low advances to step 21 and focus detecting is performed. However, if YES in step 14, the flow advances to step 15. By the state of an internal flag JF (to be described later), the microcomputer PRS determines in step 15 whether the photographing optical system LNS is set in the in-focus state. At this time, the first loop operation upon operation of the release switch SW1 is performed. The in-focus state has not yet been determined, and the flag JF is kept at logic "0". The flow advances to step 16. By the state of an internal flag AFNG (to be described later), the microcomputer PRS determines in step 16 whether a focus detecting disable state is detected. Since the first loop operation upon operation of the release switch SW1 is performed, the focus detecting disable state has not yet been determined. The flag AFNG is kept at logic "0". The flow advances to step 21 to perform the focus detecting operation.

Figure 2C:
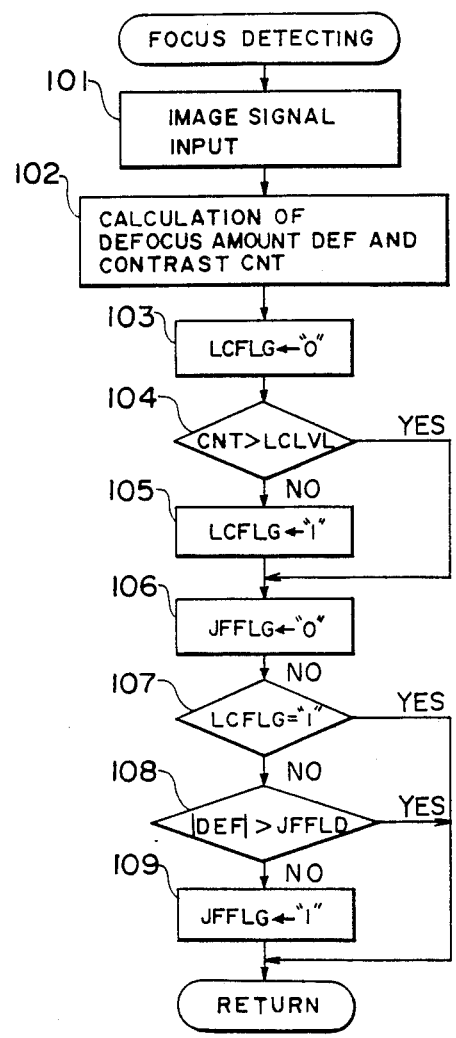

The flow advances from the focus detecting operation in step 21 to a subroutine in FIG. 2C. In the subroutine in FIG. 2C, an image signal is input to the microcomputer PRS in step 101. This input operation will be described in detail below. After the microcomputer PRS sets the signal CSDR at "H" level and selects the driver SDR, the microcomputer PRS sends the signal SO to the driver SDR. At this time, the signal SO serves as an image signal storage start instruction. In response to this instruction, the driver SDR sends the signal CLR to the line sensor unit SNS. The image signal left in the line sensor unit SNS is cleared, and a new image signal storage operation is started. Object images incident from the right and left exit pupil portions of the photographing optical system LNS are respectively formed on the pair of photoelectric transducer elements in the line sensor unit SNS. The object images are charged as an image signal. The positional relationship between the two object images is changed in accordance with a focus state of the photographing optical system LNS. When the photographing optical system LNS is set in the in-focus state, the position of the image received by one photoelectric transducer element is identical with that by the other photoelectric transducer element. When the object is gradually defocused, a difference or deviation between the object images is increased in accordance with a deviation direction and a deviation amount. Therefore, by detecting the deviation direction and amount of the object patterns, a deviation direction and a deviation amount from those obtained in the in-focus state in the photographing optical system LNS can be determined.

When storage of predetermined charge as an image signal in the photoelectric transducer section is detected by a signal AGC, the driver SDR transfers the charge from the photoelectric transducer section to the analog shift register section in response to the signal SH. The transferred charge is input to the driver SDR in synchronism with the clocks $\phi 1$ and $\phi 2$ and is amplified by the amplifier in the driver SDR. The amplified signal as the signal AOS is input to the analog input terminal of the microcomputer PRS. The microcomputer PRS converts the analog signals into digital signals by utilizing the internal A/D conversion function. The digital signals are sequentially stored at predetermined addresses of the RAM.

The image signal input to the microcomputer PRS in step 101 has been thus completed, and the flow advances to step 102.

In step 102, the microcomputer PRS calculates a defocus amount DEF (representing a deviation direction and a deviation amount between the image signals) and a contrast value CNT of the image signals input in step 101. A method of calculating the defocus and contrast amounts is known to those skilled in the art and is not essentially associated with the present invention, and a detailed description thereof will be omitted. The deviation direction and amount of the photographing optical system LNS are obtained by calculating the defocus amount, as described above. By calculating the contrast value, reliability of the defocus amount can be determined. The reliability of the defocus amount is determined based on the contrast value due to the following reason. In the low contrast state (e.g., the object does present any contrast, or the photographing optical system is completely out of focus and the object image is completely defocused), the state of the image pattern cannot be detected. Therefore, the defocus amount obtained under the above circumstances is not reliable.

The flow advances to step 103, and the microcomputer PRS resets an internal flag LCFLG to "0". The flag LCFLG represents whether the contrast value CNT is small. The flow advances to step 104, and the microcomputer PRS causes the CPU to determine whether the contrast value CNT is larger than a value corresponding to a predetermined threshold level LCLVL. If the contrast value CNT is larger than the value corresponding to the predetermined threshold level LCLVL and the defocus amount DEF is highly reliable, the flow advances to step 106. However, if the contrast value CNT is lower than the value corresponding to the predetermined threshold level and the defocus amount DEF is not reliable, the flow advances to step 105. The microcomputer PRS sets the flag LCFLG at logic "1" and causes the display to display that the contrast value CNT is smaller than the value corresponding to the predetermined threshold level LCLVL. The flow then advances to step 106.

In step 106, the microcomputer PRS resets an internal flag JFFLG to "0". The flag JFFLG represents whether the photographing optical system LNS is set in the in-focus state. The flow advances to step 107.

The microcomputer PRS determines in step 107 whether the contrast value CNT calculated in step 102 is larger than the value corresponding to the predetermined threshold level LCLVL. However, if the flag LCFLG is set at logic "1" and the contrast value CNT is smaller than the value corresponding to the predetermined threshold level LCLVL, the defocus amount DEF is determined not to be reliable. No determination is performed for this defocus amount DEF. The flow returns to the subroutine in FIG. 2B, and the operation in the next step in this subroutine is performed. However, if the flag LCFLG is set at logic "0" and the contrast value CNT is larger than the value corresponding to the predetermined threshold level LCLVL, the defocus amount DEF is highly reliable. The flow advances to step 108. The microcomputer PRS determines in step 108 whether the absolute value of the defocus amount DEF is larger than a predetermined value JFFLD. If NO in step 108, the relative positional deviation between the image signals is small or none and the photographing optical system LND is regarded to fall within the in-focus range. The flow advances to step 109, and the microcomputer PRS sets the flag JFFLG to logic "1" although this flag is reset to "0" in step 106. The flag JFFLG of logic "1" represents the in-focus state of the photographing optical system LNS. The flow returns to the subroutine in FIG. 2B, and the operation in the next step in this subroutine is performed. If the microcomputer PRS determines in step 108 that the absolute value of the defocus amount DEF is larger than the predetermined value JFFLD, the relative positional deviation between the image signals is large, and the photographing optical system LNS is regarded to be out of focus. The flow returns to the subroutine in FIG. 2B and the operation in the next step in this subroutine is performed while the flag JFFLG is kept reset to logic "0" (i.e., the photographing optical system LNS is regarded to be out of focus).

When focus detecting in step 21 shown in FIG. 2B is completed, the flow advances to step 22. In step 22, the subroutine in FIG. 2D is executed to determine the result of focus detecting in step 21.

Figure 2D:
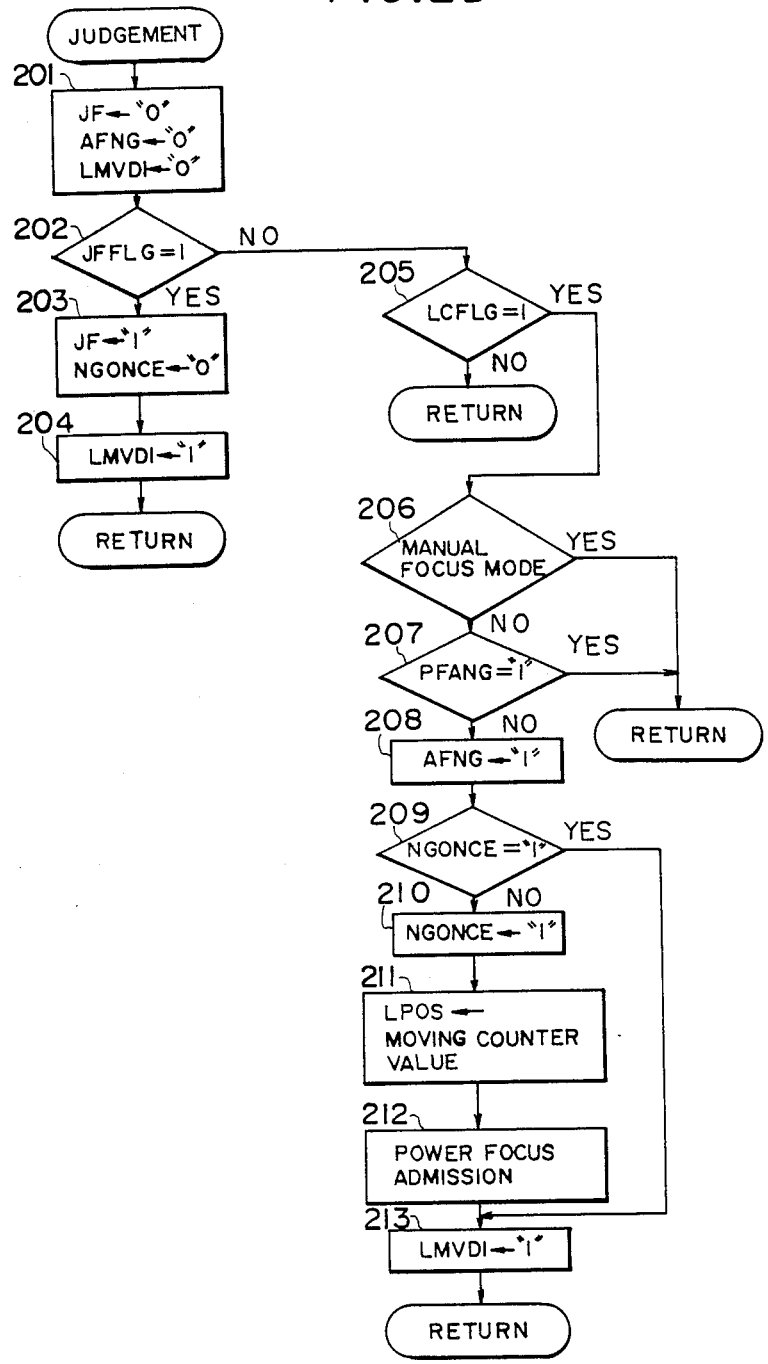

In the subroutine in FIG. 2D, internal flags JF, FNG, and LMVDI representing the determination result of focus detecting are reset to "0" in step 201. The flag JF of logic "1" represents the in-focus state of the photographing optical system LNS, the flag AFNG of logic "1" represents a focus detecting disable state, and the flag LMVDI of logic "1" represents inhibition of AF adjust drive operation based on the defocus amount DEF of the photographing optical system LNS.

The flow advances to step 202. By detecting the state of the flag JFFLG, the microcomputer PRS determines in this step whether the result of focus detecting represents the in-focus state. If the microcomputer PRS determines that the photographing optical system LNS is set in the in-focus state, the flow advances to step 203. The microcomputer PRS sets the flag JF at logic "1" to indicate that the photographing optical system PRS is set in the in-focus state. At the same time, a flag NGONCE in the microcomputer PRS is reset to logic "0". The flow advances to step 204. A detailed description of the flag NGONCE will be given later. When the microcomputer PRS determines that the photographing optical system LNS is out of focus, the flag NGONCE is set at logic "1". Unless the microcomputer PRS determines that the system LNS is set in the in-focus state and the flow advances to step 203, the flag NGONCE is reset to logic "0". In step 204, the microcomputer PRS sets the flag LMVDI to logic "1" to inhibit the AF adjust drive operation of the photographing optical system LNS on the basis of the defocus amount DEF. The flow returns to the subroutine in FIG. 2B and the operation in the next step in this subroutine is performed.

If the microcomputer PRS determines in step 202 that the flag JFFG is set at logic "0" and the photographing optical system PRS is out of focus, the flow advances to step 205. The microcomputer PRS checks the state of the contrast value CNT in accordance with the state of the flag LCFLG. Under the conditions that the flag LCFLG is set at logic "0", that the contrast value CNT is larger than the value corresponding to the predetermined threshold level LCLVL, and that the detected defocus amount DEF is highly reliable, the flow returns to the subroutine in FIG. 2B and the operation in the next step in this subroutine is performed.

However, under the conditions that the flag LCFLG is set at logic "1", that the contrast value CNT is smaller than the value corresponding to the predetermined threshold level LCLVL, and that the detected defocus amount DEF is not reliable, the flow advances to step 206. The microcomputer PRS determines in step 206 whether the manual focus mode is set. The microcomputer PRS detects the state of the auto/manual selection switch SWM through the lens processor LPRS in the same manner as in step 14 of FIG. 2B. If the auto/manual selection switch SWM is set in the manual focus mode, the flow returns to the subroutine in FIG. 2B and the operation in the next step in this subroutine is performed. However, if the auto/manual selection switch SWM is not set in the manual focus mode, the flow advances to step 207. The microcomputer PRS detects the state of an internal flag PFANG. If the flag PFANG is set at logic "1", the flow returns to the subroutine in FIG. 2B. Since the first loop operation upon operation of the release switch SW1 is performed, the flag PFANG is kept set at logic "0". The flow advances to step 208.

Since the microcomputer PRS determines in step 205 that the contrast value CNT is lower than the value corresponding to the predetermined threshold level LCLVL and the detected defocus amount DEF is not reliable, focus detecting cannot be performed using this defocus amount DEF. In step 208, the microcomputer PRS determines the focus detecting disable state by setting an internal flag AFNG. The flow advances to step 209.

By detecting the state of the flag NGONCE, the microcomputer PRS determines in step 209 whether the flag AFNG has already been set at logic "1" before the operation in step 208 is performed, i.e., whether or not the focus detecting disable state is caused. If the flag NGONCE is set at logic "1" and the flag AFNG has been set at logic "1" before the operation in step 208 is performed, the flow advances to step 213 so as to prevent repetition of an unnecessary operation. Since the focus detecting disable state is set, the flag LMVDI is set at logic "1" to inhibit the AF adjust drive operation based on the defocus amount of the photographing optical system LNS. The flow returns to the subroutine in FIG. 2B and the operation in the next step in this subroutine is performed. However, at this time, since the first loop operation upon operation of the release switch SW1 is performed, there is no previous loop operation. The flag NGONCE is kept set at logic "0", and the flow advances to step 210.

In step 210, the flag NGONCE is set at logic "1" to indicate that the loop operation for detecting the focus detecting disable state has been completed. The flow advances to step 211.

In step 211, the signal SO is supplied to the lens processor LPRS as the signal DCL from buffer LCM to instruct generation of a move count amount of the photographing optical system LNS. In response to this instruction, the lens processor LPRS reads out the move count amount from the counter LCNT. The count value as the signal SI is input to the microprocessor PRS through the buffer LCM. The move count amount represents the moving state of the photographing optical system LNS. The subsequent moving state of the photographing optical system LNS is obtained by causing the counter LCNT to always count the signal SENC from the encoder ENC with reference to the power-on clear state.

The microcomputer PRS stores the move count amount of the photographing optical system LNS as LPOS in the internal RAM. The move count amount LNS is stored as a move count amount of the photographing optical system LNS which is obtained when the focus detecting disable state is discriminated. The flow advances to step 212. Storage of the move count amount LPOS of the photographing optical system LNS in step 211 will be described later. When the power focus mode is allowed in step 212, the move count amount LPOS stored in the RAM and the subsequent move count amount of the photographing optical system LNS are compared with each other. When a difference between the reference amount and the subsequent amount exceeds a predetermined value, the camera is set in the manual focus mode or power focus mode. In the subsequent operations, only manual or power focusing is allowed. The AF adjust drive operation of the photographing optical system LNS on the basis of the defocus amount is inhibited.

In step 212, the microcomputer PRS sends the signal SO as the signal DCL from the buffer LCM to allow power focusing. In response to this instruction, the lens processor LPRS drives the focus adjustment motor LMTR on the basis of the state of the power focus switch SWP regardless of the operating state of the auto/manual selection switch SWM when the user connects the power focus switch SWP to the terminal MFI or MFO, thereby performing power focusing.

The flow advances to step 213 to set the flag LMVDI at logic "1". The AF adjust drive operation of the photographing lens LNS on the basis of the defocus amount is inhibited. The flow returns to the subroutine in FIG. 2B and the operation in the step in this subroutine is performed.

When the determination operation in step 22 in FIG. 2B is completed as described above, the flow advances to step 23. The microcomputer PRS sends the signal SO to the switch sense and display driver DDR to cause the display DSP to display the focus adjustment state of the photographing optical system LNS, such as the in-focus state represented by the flag JF or the focus detecting disable state represented by the flag AFNG.

The flow advances to step 24 and the microcomputer PRS detects the state of the auto/manual selection switch SWM through the lens processor LPRS in the same manner as in step 14. When the auto/manual selection switch SWM is set in the manual focus mode, the flow advances to step 29. The microcomputer PRS sends the signal as the signal DCL from the buffer LCM, thereby outputting the defocus amount DEF to the camera/lens contact block CON. This defocus amount DEF is used for detecting the operating state in AF adjustment. A test during the manufacture of cameras and a test after assembly of the cameras can be conveniently performed since the defocus amount DEF appears at the camera/lens contact block CON exposed outside. Therefore, high-precision testing can be easily performed. In this case, the drive instruction for the photographing optical system LNS is not output to the lens, and the photographing optical system LNS is not erroneously operated by the defocus amount DEF. The flow returns to the main routine in FIG. 2A, and the state of the first release switch SW1 is detected again in step 1.

When the microcomputer PRS determines in step 24 of FIG. 2B that the manual focus mode is not set, the flow advances to step 25 and the microcomputer PRS detects the state of the flag PFANG. Since the first loop operation upon operation of the release switch SW1 is performed, the flag FPANG is kept reset to "0". The flow advances to step 26.

Figure 2E:
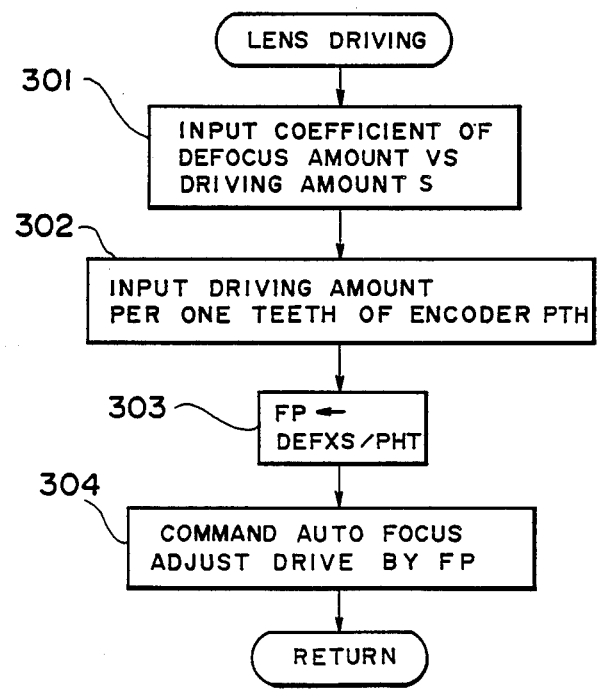

The microcomputer PRS determines in step 26 whether the AF adjust drive operation of the photographing system LNS on the basis of the defocus amount DEF is inhibited. If the flag LMVDI is set at logic "1" and the AF adjust drive operation is inhibited, the flow returns to step 1 in the main routine in FIG. 2A. The microcomputer PRS detects the state of the release switch SW1 again. However, if the flag LMVDI is set at logic "0" in step 26, the AF adjust drive operation based on the defocus amount DEF is not inhibited. The flow advances to step 27 and the AF adjust drive operation of the photographing optical system LNS on the basis of the defocus amount DEF is performed in a subroutine in FIG. 2E. In the subroutine of FIG. 2E, the microcomputer PRS sends the signal SO to the lens processor LPRS as the signal DCL through the buffer LCM to instruct generation of a "coefficient S of the defocus amount vs. the driving amount of the photographing optical system LNS". In response to this instruction, the lens processor LPRS sends the signal DLC from the buffer LCM as the signal SI to the microcomputer PRS.

In step 302, the microcomputer PRS sends the signal SO to the lens processor LPRS as the signal DCL through the buffer LCM again to instruct generation of a "driving amount PTH per tooth of the encoder ENC". In response to this instruction, the lens processor LPRS sends the driving amount PTH as the signal DCL through the buffer LCM and inputs it as the signal SI to the microcomputer PRS.

In step 303, the microcomputer PRS calculates a driving amount FP of the photographing optical system LNS by the CPU on the basis of the "coefficient S of the defocus amount vs. the driving amount of the photographing optical system LNS", obtained in step 301 and the driving amount PTH per tooth of the encoder ENC1, obtained in step 302 of FIG. 2C in accordance with the following equation.

$$FP = DEF \times X/PTH$$

In step 304, the microcomputer PRS sends the signal SO to the lens processor LPRS as the signal DCL through the buffer LCM to instruct generation of the driving amount FP, thereby driving the photographing lens LNS. In response to this instruction, the lens processor LPRS drives the focus adjustment motor LMTR by the driving amount FP in accordance with the signals LMF and LMR. The photographing optical system LNS is moved to the in-focus position.

The flow returns to the subroutine in FIG. 2B and step 28. The microcomputer PRS sets the flag PRMV at logic "1" to indicate that the AF adjust drive operation of the photographing optical system has been performed. The flow returns to the main routine in FIG. 2A and the operation in step 1 is performed. The microcomputer PRS detects the state of the release switch SW1.

The flow returns to step 1 in FIG. 2A as described above, and the state of the release switch SW1 is detected. When the release switch SW1 is determined to be OFF, the flow advances to step 2 and all the flags are reset to "0". Detection of the release switch SW1 and resetting of all the flags are repeated until the release switch SW1 is turned on. When the release switch SW1 is turned on, the flow advances from step 1 to step 3. After AE control as described above is performed, AF control is performed in step 4.

When the microcomputer PRS detects in step 1 that the release switch SW1 is kept ON, the flow advances to step 3. AE control is performed in the same manner as in the first loop operation. The flow advances to step 4, and the second AF control operation upon operation of the release switch SW1 is performed.

In AF control in step 4, the flow advances to the subroutine in FIG. 2B in the same manner as in the first loop operation. In the subroutine of FIG. 2B, the microcomputer PRS detects the state of the flag PRMV in step 11 to determine whether the photographing optical system LNS is driven for AF adjustment by the focus adjustment motor LMTR. If the flag PRMV is set at logic "0" and the AF adjust drive operation is not performed, the flow advances to step 14. The microcomputer PRS determines in step 14 whether the one-shot mode is set. If the flag PRMV is set at logic "1" and the AF adjust drive operation is performed, the flow advances to step 12. The microcomputer PRS sends the signal SO to the lens processor LPRS as the signal DCL through the buffer LCM to instruct whether the AF adjust drive operation of the photographing optical system LNS is completed. In response to this instruction, the lens processor LPRS generates through the buffer DCL the signal DCL representing whether the AF adjust drive operation is completed. The signal DCL is input to the microcomputer PRS as the signal SI. If the AF adjust drive operation of the photographing optical system LNS is not completed, the flow returns to the main routine in FIG. 2A and the operation in step 1 is performed again. That is, the state of the release switch SW1 is detected. As long as the release switch SW1 is kept ON, the above loop operations are repeated until the AF adjust drive operation of the photographing optical system LNS is completed. When the microcomputer PRS determines the end of the AF adjust drive operation of the photographing optical system LNS in step 12, the flow advances to step 13. The microcomputer PRS resets the flag PRMV to logic "0", and the flow advances to step 14. In the above operations, the driving amount is sent to the counter in the microcomputer PRS and the signal SENC is sent to the counter upon lens driving in the subroutine in FIG. 2E. If these inputs coincide with each other, the end of the AF adjust drive operation is detected.

By detecting the states of auto/manual selection switch SWM and the one-shot/servo selection switch SWS in the same manner as in the first loop operation, the microcomputer PRS determines in step 14 whether the one-shot mode is set. If NO in step 14, focus detecting in step 21 is performed. However, if YES in step 14, the flow advances to step 15. By detecting the state of the flag JF, the microcomputer PRS determines in step 15 whether the photographing optical system LNS is set in the in-focus position. If the flag JF is set at logic "1" to determine the in-focus state of the photographing optical system LNS in step 203 of FIG. 2D in the previous loop operation, the flow returns to the main routine in FIG. 2A. These loop operations are repeated as long as the release switch SW1 is kept ON and the one-shot mode is set. In other words, in the one-shot mode, once the photographing optical system LNS is set in the in-focus state, the photographing optical system LNS is not moved even after the object is moved and out of focus.

If the microcomputer PRS determines in step 15 that the flag JF is set at logic "0" and the in-focus state is not obtained, the flow advances to step 16. By detecting the state of the flag AFNG, the microcomputer PRS determines in step 16 whether the focus detecting disable state is set. If the flag AFNG is set at logic "1" in step 208 in the previous loop operation so that the focus detecting disable state is detected, the flow advances to step 17. However, if the microcomputer PRS determines that the flag AFNG is kept at logic "0" and the focus detecting disable state is not detected, the flow advances to step 21.

If the focus detecting disable state is detected and the flow advances from step 16 to step 17, the microcomputer PRS sends the signal SO to the lens processor LPROS as the signal DCL through the buffer LCM to instruct generation of a current move count amount FCNT representing the moving state of the photographing optical system LNS. In response to this instruction, the lens processor LPRS reads out the corresponding move count amount from the counter LCNT, and the readout count amount is sent as the signal DLC and input as the signal SI to the microcomputer PRS through the buffer LCM.

The flow advances to step 18, and the microcomputer PRS causes the internal CPU to calculate an absolute value CBB=|FCNT−LPOS| of a difference between the current move count amount FCNT of the photographing optical system LNS and the count amount LPOS obtained upon determination of the focus detecting disable state in step 211 of FIG. 2D.

The flow advances to step 19 and the microcomputer PRS causes the CPU to determine whether the absolute value CBB is larger than a predetermined value LPER. If the microcomputer PRS determines that the absolute value CBB is larger than the predetermined value, the photographing optical system LNS has moved by a distance exceeding the predetermined value upon determination of the focus detecting disable state in the previous loop. The AF adjust drive operation based on the defocus amount is inhibited in step 213 of FIG. 2D. The photographing optical system LNS is moved by power focusing after the power focus mode is set in step 212 or by manual focusing. The flow advances to step 20 and the microcomputer PRS sets the flag PFANG to logic "1" to indicate power or manual focusing has been completed. The flow then advances to step 21.

If the microcomputer PRS determines in step 19 that the absolute value CBB is smaller than the predetermined value LPER, the photographing optical system LNS s not moved by a distance exceeding the predetermined value after the focus detecting disable state is detected in the previous loop operation. Power or manual focusing is not performed after the power focus mode is set in step 212 in FIG. 2D. The flag PFANG is kept at logic "0", and the flow advances to step 21.

Focus detecting is performed in step 21 in the same manner as in the previous loop operation. The determination block in step 22 is then executed. The same operations as in the previous loop operation are performed up to step 206 in the subroutine of FIG. 2D. The microcomputer PRS detects the state of the flag PFANG in step 207. If the flag PFANG is kept at logic "0", the flow advances up to step 209 in the same manner as in the previous loop operation. The microcomputer PRS detects the state of the flag NGONCE in step 209. When the microcomputer PRS determines that the flag NGONCE is set at logic "1" and the focus detecting disable state is set in the previous loop operation, the flow advances to step 213 in order to prevent unnecessary operations such as setting of the flag NGONCE to logic "1" again. Since the focus detecting disable state is detected, the microcomputer PRS sets the flag LMVDI to logic "1" in step 213 to inhibit the AF adjust drive operation of the photographing optical system LNS on the basis of the defocus amount. The flow returns to the subroutine in FIG. 2B, and the operation in step 23 is performed. The subsequent operations are the same as those in the previous loop operation. If the flag NGONCE is kept at logic "0" in step 209, the focus detecting disable state is not detected in the previous loop operation but in the current loop operation. The flow advances to step 210, and the subsequent operations are the same as the first loop operations.

When the microcomputer PRS determines in step 207 that the flag PFANG is set at logic "1" and power focusing is performed after the focus detecting disable state is detected, the flow returns to the subroutine in FIG. 2B. The operation in step 23 is performed In step 23, the focus adjustment state of the photographing optical system LNS is displayed in the same manner as in the previous loop operation. The flag AFNG representing the focus detecting disable state is reset to "0" in step 201 and this logical state is kept unchanged. When power focusing is performed after the focus detecting disable state is detected, the focus detecting disable state is not displayed. Confusion and operation errors which are caused by display of the focus detecting disable state during power focusing are prevented. The flow advances to step 24 and the microcomputer PRS determines whether the manual focus mode is set. Since the flag PFANG is set at logic "1", the manual focus mode is not set. The flow advances to step 25. The microcomputer PRS detects the state of the flag PFANG. The flag PFANG is set at logic "1", and the flow advances to step 29. In step 29, the defocus amount DEF is output to the camera/lens contact block CON as described with reference to the previous loop operation. The flow returns to the main routine in FIG. 2A. The operations from step 1 are repeated. That is, when power or manual focusing is actually performed after the focus detecting disable state is detected in step 22 of FIG. 2B in the one-shot mode and the power focus mode is set, the flag PFANG is set at logic "1". The above loop operations are repeated. The AF adjust drive operation of the photographing optical system. LNS on the basis of the defocus amount is inhibited as long as the release switch SW1 is ON. Only power or manual focusing is allowed.

In the above embodiment, the defocus amount DEF output in step 29 may be the actual driving amount FP of the photographing optical system and other focus adjustment information.

In the above embodiment, manual or power focusing is performed in the focus detecting disable state in only the one-shot mode. However, the above operation may be performed in the servo mode.

According to the present invention as described above, the user can arbitrarily select the AF or manual focus mode. If the lens cannot be automatically focused in the AF mode, the AF mode can be automatically switched to the manual focus mode, thereby providing a convenient camera with good operability.

When the AF mode is automatically switched to the manual focus mode, the AF mode is not set during manual focusing in the manual focus mode. Therefore, operability of the camera can be further improved.

What is claimed is:

1. A camera for causing an automatic focusing apparatus including a focus detection circuit for detecting a focus state to drive a focusing optical system to an in-focus position on the basis of a focus state, comprising:
   discriminating means for discriminating a focus detecting enable or disable state of said automatic focusing apparatus;
   inhibiting means for inhibiting an operation of said automatic focusing apparatus when said discriminating means discriminates the focus detecting disable state, said inhibiting means being adapted to cancel an inhibition state of said automatic focusing apparatus when said discriminating means discriminates the focus detecting enable state;

detecting means for detecting a manual operation of said focusing optical system; and holding means for holding the inhibition state of said inhibiting means when movement of said focusing optical system by the manual operation is detected while the operation of said automatic focusing apparatus is inhibited by said inhibiting means.

2. A camera according to claim 1, wherein said holding means is actuated when said detecting means detects movement while the operation of said automatic focusing apparatus is inhibited by said inhibiting means.

3. A camera according to claim 2, further comprising a manual focus circuit for driving said focusing optical system independently of said automatic focusing apparatus, and an operation member for operating said manual focus circuit and causing movement of said focusing optical system by the manual operation, and wherein said detecting means detects driving of said focusing optical system when said focusing optical system is driven by the operation of said manual focus circuit upon operation of said operation member.

4. A camera according to claim 1, wherein said inhibiting means allows operation of said automatic focusing apparatus in a first state and inhibiting operation of said automatic focusing apparatus in a second state, said camera further comprising a switching circuit for switching said inhibiting means from the first state to the second state when said discriminating means discriminates the focus detecting disable state and from the second state to the first state when said discriminating means discriminates the focus detecting enable state in the second state, and said holding means inhibits switching of said switching circuit from the second state to the first state when movement of said focusing optical system is inhibited.

5. A camera for causing an automatic focusing apparatus including a focus detection circuit for detecting a focus state to drive a focusing optical system to an in-focus position on the basis of a detected focus state, comprising:

discriminating means for discriminating a focus detecting enable or disable state of said automatic focusing apparatus;

indicating means for indicating the focus detecting disable state when said discriminating means discriminates the focus detecting disable state;

detecting means for detecting a manual operation of said focusing optical system; and indication control means for cancelling a focus detecting disable state indication of said indicating means when movement of said focusing optical system by the manual operation is detected when said indicating means indicates the focus detecting disable state.

6. A camera according to claim 5, further comprising an operation member and a manual focus circuit for driving said focusing optical system upon operation of said operation member, the movement of said focusing optical system by the manual operation being performed by driving said focusing optical system by said manual focus circuit.

7. An auto-focus device having a auto-focus mode and a manual-focus mode, wherein a photographing mode is changed from the auto-focus mode into the manual-focus mode by a changing circuit when a focusing operation in the auto-focus mode is not appropriate, and wherein the photographing mode is changed into the auto-focus mode when the focusing operation in the auto-focus mode becomes appropriate, said auto-focus device comprising:

detecting means for detecting a manual focusing operation; and prohibiting means for prohibiting the photographing mode being changed from the manual-focus mode to the auto-focus mode in response to the manual focusing operation being detected after the transition of photographing mode from auto-focus to manual-focus.

8. An auto-focus device according to claim 7 further comprising an operation member, said prohibiting means being operated in response to the operation of said operation member.

9. An auto-focus device according to claim 7 wherein said detecting means detects an imaging optical means being moved by the manual focusing operation, said prohibiting means being operated in response to an output of said detecting means.

10. An auto-focus device according to claim 7, further comprising a motor for executing the manual focusing operation by driving the imaging optical system with said motor.

11. A camera for causing an auto-focusing apparatus including a focus detection circuit for detecting a focusing state to drive an imaging optical system to an in-focus position on the basis of a detected focusing state, comprising:

discriminating means for discriminating a focus detection enable or disable state of said auto-focusing apparatus;

indicating means for indicating a focus detection disable state when said discriminating means discriminates the focus detection disable state;

detecting means for detecting a manual focusing operation; and indication control means for cancelling the indication of the focus detection disable state by said indicating means when the manual focusing operation is executed when the focus detection disable state is indicated.

12. An auto-focus device according to claim 11, further comprising a motor for executing the manual focusing operation by driving the imaging optical system with said motor.

* * * * *

UNITED STATES PATENT AND TRADEMARK OFFICE
CERTIFICATE OF CORRECTION

PATENT NO. : 4,845,521

DATED : July 4, 1989

INVENTOR(S) : Akashi

It is certified that error appears in the above-identified patent and that said Letters Patent is hereby corrected as shown below:

COLUMN 14
  Line 63, change "focus state," to --detected focus state,--.

COLUMN 16
  Line 8, change "a" to --an--.

Signed and Sealed this

Nineteenth Day of June, 1990

Attest:

HARRY F. MANBECK, JR.

*Attesting Officer*    *Commissioner of Patents and Trademarks*